(No Model.)
J. H. BEARE.
RELIEF VALVE.
No. 591,375.  Patented Oct. 12, 1897.
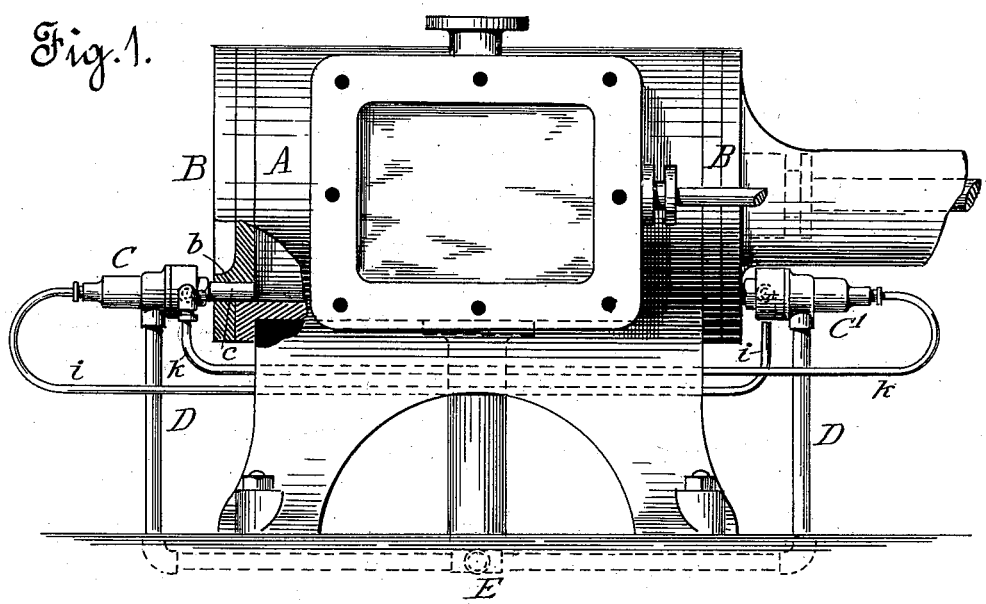

UNITED STATES PATENT OFFICE.

JOSEPH HENRY BEARE, OF STOCKTON, CALIFORNIA.

RELIEF-VALVE.

SPECIFICATION forming part of Letters Patent No. 591,375, dated October 12, 1897.

Application filed April 28, 1897. Serial No. 634,284. (No model.)

*To all whom it may concern:*

Be it known that I, JOSEPH HENRY BEARE, a citizen of the United States, residing at Stockton, in the county of San Joaquin and State of California, have invented certain new and useful Improvements in Relief-Valves; and I do hereby declare that the following is a full, clear, and exact description thereof.

My invention relates to relief-valves used in engine-cylinders for permitting the water of condensation to escape, and thus avoiding injury to the cylinders.

The apparatus in which I have embodied my invention comprises two separate valves, one at each end of the cylinders, having steam connections with each other and independent escapes for water. This apparatus is fully hereinafter described and is shown in the accompanying drawings, in which—

Figure 1 is a side elevation of a horizontal engine-cylinder with my relief-valves attached. Fig. 2 is a horizontal longitudinal section of one of the valve-casings with the valve opened, as in ejecting water. Fig. 3 is a similar section of part of the same casing with the valve closed. Fig. 4 is a cross-section on line $x x$ of Fig. 2. Fig. 5 is an end view of the valve.

A represents a steam-cylinder, shown in this case as belonging to a horizontal engine. Opening into and through each cylinder-head B is a hole $b$, which receives the short tube $c$, having a threaded end $d$. A valve is connected to each of these tubes, and such valves are of similar construction. A hollow coupling $e$ is threaded upon the end of each tube by means of a nut $f$ and is internally threaded, as shown at $g$. The valve-casing C is screwed into this coupling, a flange $h$ abutting against the coupling, as shown. From the end of the casing a steam-pipe $i$ extends to the other end of the cylinder and is connected to a port leading into the hollow coupling on the valve C' at that end. A similar steam-pipe $k$ leads from the end of valve-casing C' and connects with the hollow coupling of casing C. These connections are fully shown in Fig. 1. An escape-pipe D for water leads from each valve-casing, and for convenience the two pipes are connected to a common waste-pipe E, which carries off the water.

The valve within the casing and connected coupling consists of two parts, a hollow piston F, having a ground joint within a reduced part of the interior of the casing, and the valve proper, G, connected to said piston by a stem $l$. The valve G is guided in a diaphragm $m$, forming part of a threaded ring H, screwed into and up against the end of coupling $e$. The diaphragm has a central hole to receive and guide the pin $n$, which projects from the valve, and other holes $o$ to permit water and steam to pass. The valve G has a flange $p$, in which are ports $q$ to permit the water to escape into the interior of the casing. A spring $r$ may be placed between the piston F and the end of the valve-casing, which tends to keep the valve open, as in Fig. 2. This spring is not essential, however, as it is intended that the pressure of steam at the end of the casing shall open the valve. The spring when used is simply to insure this operation taking place in case the valve should stick or bind or when the engine is at rest.

In the operation of this device we will suppose that the valve in Figs. 2 and 3 is the right-hand valve of Fig. 1. As the piston approaches that end of the cylinder the water is ejected through the tube $c$, passing through the diaphragm and the ports $q$ and escaping through the water-exit D, the valve remaining open. Water also fills the pipe $i$.

When live steam is admitted to that end of the engine-cylinder, it closes the valve G, so that it assumes the position of Fig. 3, and some steam escapes into the pipe $i$. This steam acts upon the body of water in that pipe, producing pressure upon the piston F in valve-chamber C and opening that valve, so that on the return stroke of the piston water will be discharged at that end also. Thus at the end of each stroke water is discharged by the piston through the open relief-valve, while at the admission of steam immediately after such relief-valve is closed and steam and water pressure produced at the other end to open the other relief-valve. The valve action is entirely automatic, and the cylinder is entirely relieved of water at every stroke.

The springs $r$ open the valves at both ends when the engine is at rest, and so drains the cylinder as soon as the engine stops.

As the cylinder is entirely relieved of water at every stroke drier steam is caused in the cylinder, producing greater expansion and efficiency with economy in fuel. Increased efficiency is also obtained, because less clearance is required in the engine-cylinder when it is relieved at every stroke, and it has been practically demonstrated that with my device in use a great saving in coal results.

Having thus fully described my invention, what I claim as new, and desire to secure by Letters Patent, is—

1. In combination with an engine-cylinder, a relief-valve casing at each end thereof, an exit for steam from said casing, a valve in said casing adapted to be closed by steam-pressure from the cylinder, an outlet for water from the casing, and an inlet for admitting pressure from the other end of the cylinder to open said valve, substantially as described.

2. In combination with an engine-cylinder and its piston, a valve-casing at each end of the cylinder, separate pipes connecting the casings each with the other, and a relief-valve in each casing normally open to permit the piston to eject water through it at the end of each stroke, each valve being closed by live-steam pressure at its end of the cylinder, and opened by live-steam pressure in one of said pipes from the other end of the cylinder, substantially as described.

3. In combination with an engine cylinder and piston, a relief-valve casing at each end of the cylinder having a valve, a separate pipe connecting the body of each valve-casing with the end of the other, and an escape for water from the body of each casing; whereby at the end of each stroke water is discharged by the engine-piston through the open relief-valve, while at the admission of steam immediately after, such relief-valve is closed, and steam and water pressure produced through one of said pipes to open the other relief-valve, substantially as described.

4. In a relief-valve, and in combination, a coupling forming a hollow chamber and adapted to be connected to an engine-cylinder, a valve-casing connected to said coupling, an exit for steam from said hollow chamber, a valve in said chamber seating against the end of said casing when closed by steam-pressure from the engine-cylinder, a piston connected to said valve and fitted to slide in the casing, an outlet for water, and an inlet for admitting pressure against said piston to open said valve, substantially as described.

5. In a relief-valve, and in combination, a coupling forming a hollow chamber and adapted to be connected to an engine-cylinder, a perforated diaphragm secured within said chamber, a valve-casing forming a continuation of said chamber, a piston sliding therein, a water-exit from the valve-casing between said valve and piston, and an inlet for pressure at the outer end of the casing, substantially as described.

6. In combination with an engine-cylinder, a relief-valve casing at each end thereof containing a valve-seat, a sliding valve in each casing, a sliding piston connected to each valve, a spring for each valve tending to unseat it, an escape for water from each casing, and pipes connecting said casings with each other, all constructed and arranged, so that said valves are normally operated by steam-pressure from the cylinder, but are opened by said springs, as soon as the engine is at rest, substantially as described.

In testimony whereof I have affixed my signature, in presence of two witnesses, this 16th day of April, 1897.

JOSEPH HENRY BEARE.

Witnesses:
L. W. SEELY,
MARIE J. DIETZ.